July 21, 1959

C. A. E. OLDHAM 2,895,748

BAND TYPE CLAMP FOR FLANGED PIPES

Filed Sept. 12, 1957

INVENTOR.
CHARLES A.E. OLDHAM

2,895,748

BAND TYPE CLAMP FOR FLANGED PIPES

Charles Albert Edward Oldham, Clapham, London, England

Application September 12, 1957, Serial No. 683,480

2 Claims. (Cl. 285—410)

This invention has reference to improvements in and relating to devices for coupling opposed tubular members or opposed pipes together, hereinafter called "pipe joints"; and the invention is particularly applicable to a pipe joint comprising a constricting member surrounding and pressing against the outer sides of two opposed substantially circular flanges which member is adapted when tightened around the flanges to produce lateral components of force which urge the flanges towards each other.

In accordance with the invention a constricting member in or for a pipe joint as above set forth comprises a flexible band spaced along the length of which and rotatable or partially rotatable on axes transverse to which are opposed projections adapted to press against the outer sides of the above-mentioned flanges when the band encircles them.

The projections are preferably in pairs; the opposite faces of each pair of opposed projections are preferably conical or consist of parts of cones, the axis of either cone being in the axis of rotation or partial rotation of the projection and the said faces being relatively divergent. A constricting member provided with such conical projections is preferably used in conjunction with flanges which are chamfered on their outer sides, the conicity of the cones and the conicity of the chamfers preferably being of about the same order. Alternatively either the projections only or the outer sides of the flanges only may contain the conical surfaces.

In the preferred example of construction of constricting member according to the invention the band comprises a length of chain of figure-of-eight link and cross pivot type (i.e., chain comparable with that frequently used in chain gearing save the cross pivots need not carry rollers) on selected pivots of which the pairs of projections are mounted in rotatable or partially rotatable manner. The said pairs of projections may be provided by grooved pulleys, preferably V-groove pulleys. Those parts of the flanges of the pulleys which would otherwise project beyond the outer circumference of the band when the latter is in use are preferably removed in order to reduce the overall diameter of the band; and when the said flange-parts are removed the projections, i.e., the remaining portions of the flanges, have lateral teeth which by engagement with the chain links limit the angle of rotation of the projections. The object in so limiting the said angle is, of course, to keep the projections at one and the same face of the band.

The ends of the band are preferably pulled towards each other by screw and nut means. The screw has a head which is half round at its junction with the screw, one end of the band having an outwardly projecting lug in which is a half round socket for the reception of the corresponding part of the head; the screw engages a nut carried by the other end of the band rotatable on an axis lying transverse to the band.

The constricting member is preferably applied to the pipe joint in accordance with the invention claimed in my Patent No. 2,788,993 save the present constricting member is used in place of the constricting member according to the said patent.

The preferred example of construction of constricting member according to the invention will now be described with reference to the accompanying drawings wherein.

Figure 1:
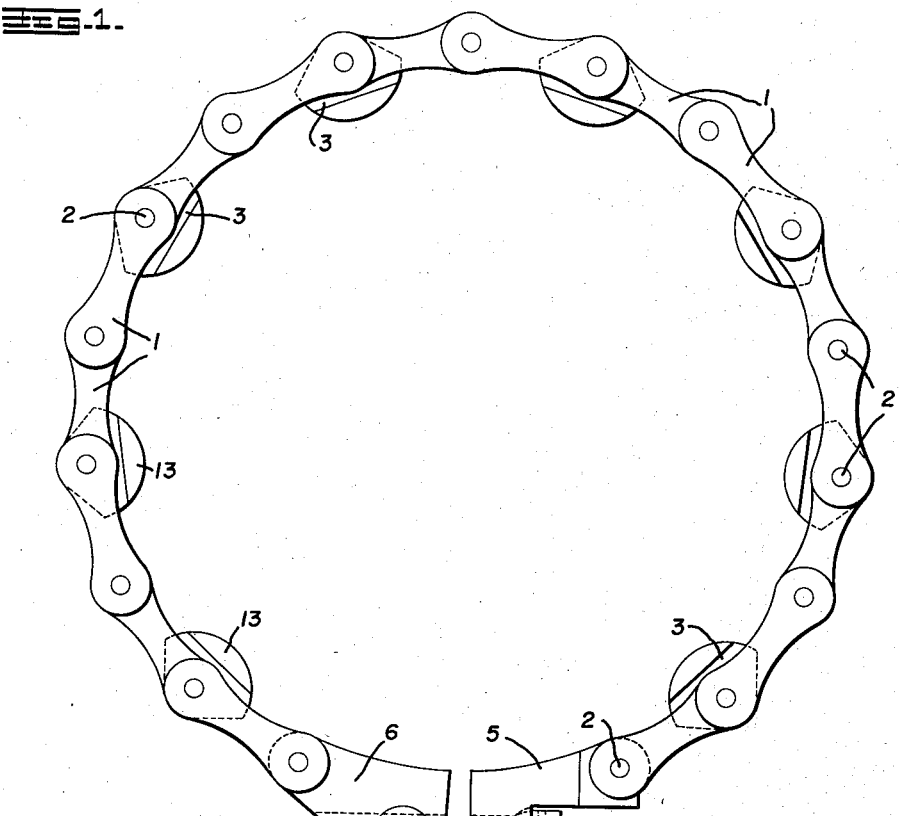
Fig. 1 is a plan view of the said member, the ends thereof being connected together by a means for contracting the band.

The band shown in Fig. 1 comprises a length of chain of figure-of-eight link and cross pivot type (i.e., chain comparable with that frequently used in chain gearing save the cross pivots do not carry rollers in the example shown although they may do so), the links being indicated by 1 and the cross pivots by 2. On the second pivot from either end and on alternate pivots thereafter are grooved elements 3 providing pairs of projections 4 which extend inwardly of the closed band as is shown in Fig. 1. The opposite faces of each pair of projections are conical i.e., divergent. The pivots 2 at the ends of the chain secure blocks 5 and 6 to the said ends. Block 5 has an outwardly projecting lug 7 in which is a half round socket 8. Block 6 has an outwardly projecting part in which are two holes adapted to provide bearings for the ends of a cylindrical nut 9, the screw threaded bore of the said nut extending through same at right angles to the axis thereof. The half round end 10 of a screw 11 entering the nut 9 lies in the half round socket 8 in the lug 7 but the threaded part of the screw does not engage the lug. The said socket is on that face of the lug furthest from the block 6. Hence, when the screw is tightened the ends of the chain are drawn towards each other. In this manner the band is contracted. The lug 7 is slotted at 12 so that the head end of the screw can be introduced into the lug and the half round head thereof introduced into the socket by slipping this end of the screw sidewardly into the lug. This enables the screw to be quickly engaged with the lug and to be disengaged equally rapidly. One end of each element 3 is provided with a laterally extending tooth 13 which, whilst allowing the element to turn through a limited angle on the pivot 2 prevents the element from turning into such a position that the projections 4 do not extend inwardly of the closed band, that is to say the teeth 13 have the effect of keeping the projections to one and the same side of the band but permit of some turning or rocking movement of the projections on their pivots.

It will be understood that the constricting device shown in the drawings is wrapped around the opposed flanges of a pipe joint after the screw 11 has been separated from the block 5. The head 10 is then introduced into the socket 8 and the screw turned. The ends of the band are thus drawn together and the inclined surfaces 4 apply a lateral component of force to the opposed flanges with the result that the flanges are urged towards each other, thus closing the pipe joint.

Figure 2:
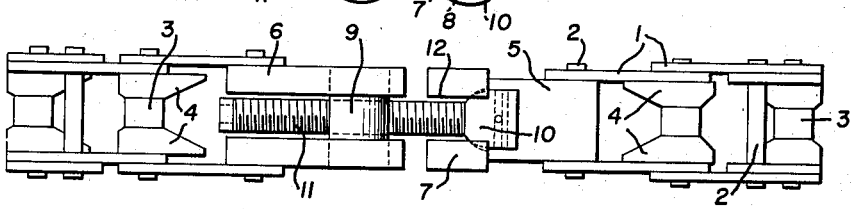
Fig. 2 is a side elevation of the said member shown in Fig. 1.
Figure 4:
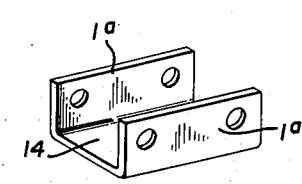
Fig. 4 is a perspective view of a modified form of chain link which can be used in the constricting member.
Figure 3:
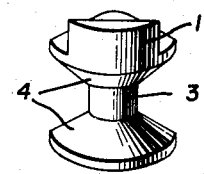
Fig. 3 is a perspective view of one of the elements incorporated in Fig. 1 for providing a pair of relatively divergent projections.

The links 1 shown in Figs. 1 and 2 may be of rectangular form instead of "figure-of-eight" form and in either case may be joined in pairs by a web. An example of two links of rectangular form joined by a web is shown in Fig. 4 wherein the links are indicated by 1a and the web by 14. When such links are incorporated in a constricting member according to the invention the webs lie on the outside of said member when the ends of the member are joined together.

What I claim is:

1. A constricting member for urging two opposed substantially circular pipe flanges towards each other in a fluid tight joint, comprising a pair of spaced flexible bands for encircling said flanges, flange clamping means pivotally mounted between said bands on axes extending transversely of the constricting member, said means constituting elements spaced along said member and resembling segments of spools each having a pivot portion carrying laterally spaced inwardly directed projections with opposed faces for straddling the pipe flanges, said faces having inwardly flaring substantially conical segmental surfaces for substantial line contact with the pipe flanges, and means between said elements and said bands maintaining said projections all on the inner side only of said constricting member and limiting pivotal movement of said elements on their axes, whereby said elements press against the outer axial sides of the pipe flanges when the member encircles the pipe flanges and produce components of force which urge the pipe flanges towards each other.

2. A constricting member according to claim 1 wherein said means comprises a lateral extension on a projection of each element with said extension overlying one of said bands in spaced relation.

References Cited in the file of this patent

UNITED STATES PATENTS

| | | |
|---|---|---|
| 2,640,717 | Scheuring | June 2, 1953 |
| 2,653,836 | Christophersen et al. | Sept. 29, 1953 |
| 2,675,253 | Stade | Apr. 13, 1954 |
| 2,788,993 | Oldham | Apr. 16, 1957 |

FOREIGN PATENTS

| | | |
|---|---|---|
| 591,284 | Great Britain | Aug. 13, 1947 |
| 667,292 | Great Britain | Feb. 27, 1952 |
| 851,292 | Germany | Oct. 2, 1952 |
| 1,092,384 | France | Nov. 10, 1954 |